C. A. BAYLOR.
COASTER BRAKE.
APPLICATION FILED JAN. 12, 1909.
942,479.
Patented Dec. 7, 1909.
3 SHEETS—SHEET 1.
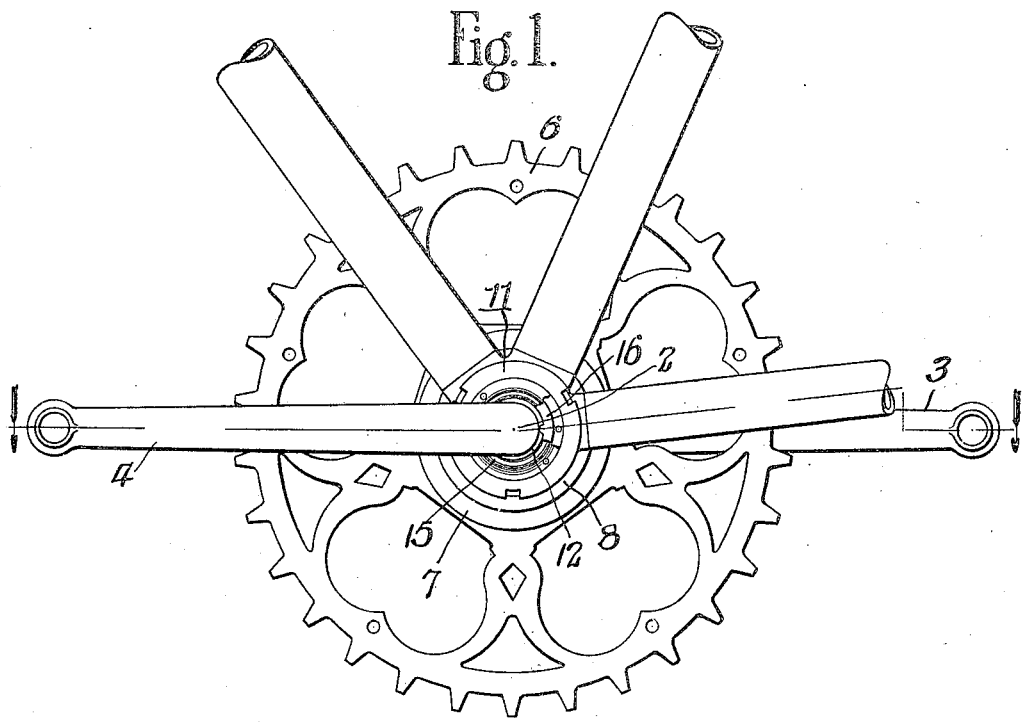
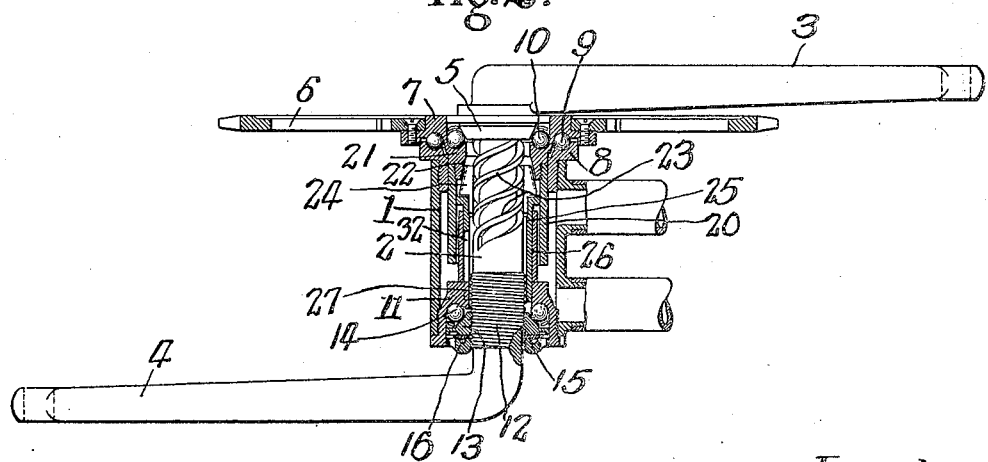
Witnesses:
T. H. Alfreds
G. R. Wilkins
Inventor:
Charles A. Baylor.
by Poole, Brown
Attys

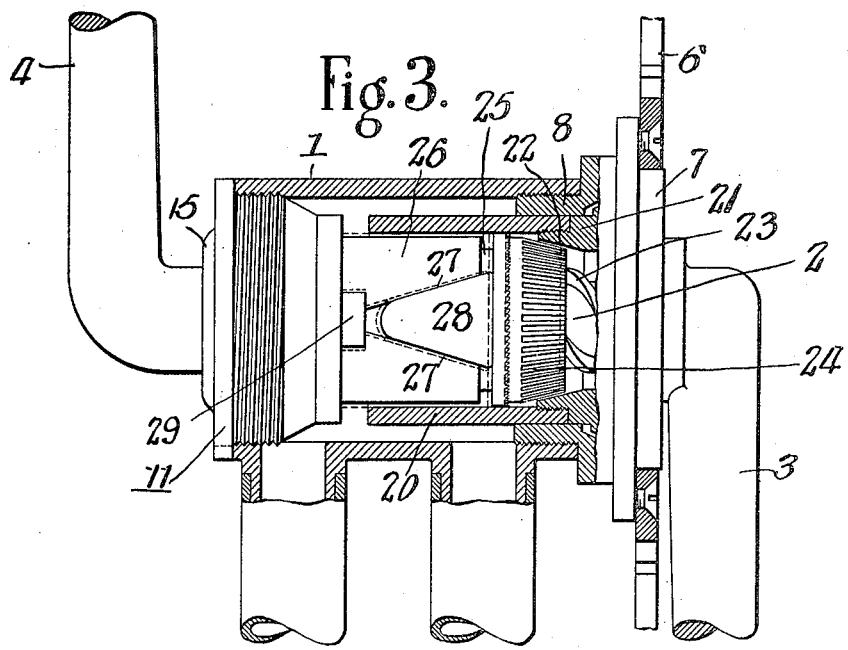
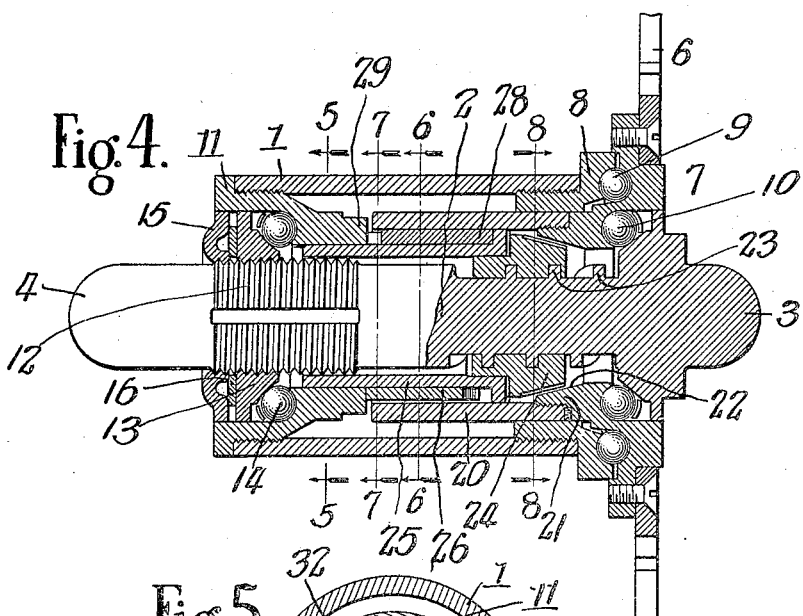
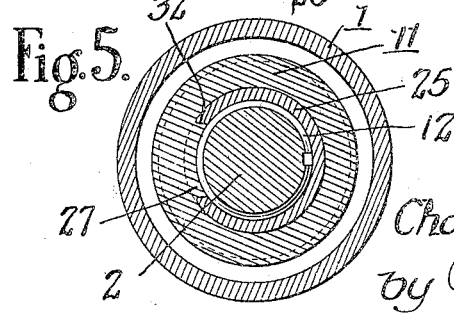

C. A. BAYLOR.
COASTER BRAKE.
APPLICATION FILED JAN. 12, 1909.
942,479.
Patented Dec. 7, 1909.
3 SHEETS—SHEET 3.
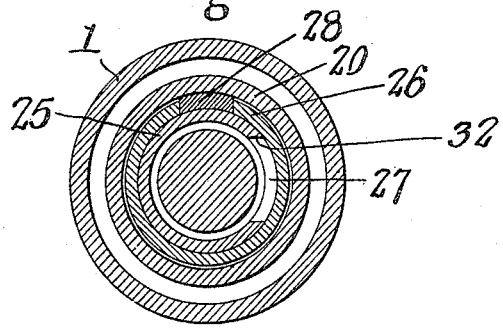
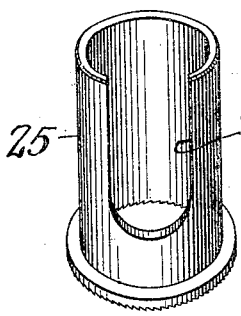
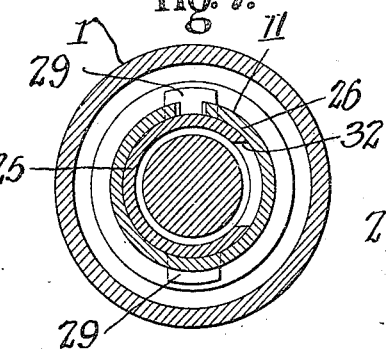
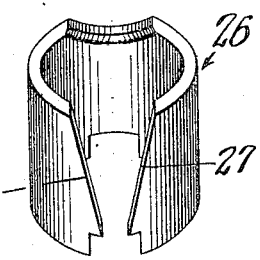
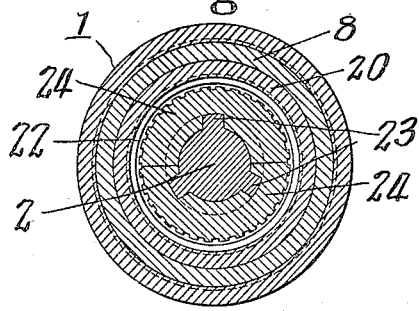
Witnesses:
T. H. Alfreds
G. R. Wilkins
Inventor.
Charles A. Baylor.
by Poole & Brown
Attys

UNITED STATES PATENT OFFICE.

CHARLES A. BAYLOR, OF LAPORTE, INDIANA, ASSIGNOR TO GREAT WESTERN MANUFACTURING COMPANY, A CORPORATION OF ILLINOIS.

COASTER-BRAKE.

942,479.  Specification of Letters Patent.  Patented Dec. 7, 1909.

Application filed January 12, 1909. Serial No. 471,847.

*To all whom it may concern:*

Be it known that I, CHARLES A. BAYLOR, a citizen of the United States, and a resident of Laporte, in the county of Laporte and State of Indiana, have invented certain new and useful Improvements in Coaster-Brakes; and I do hereby declare that the following is a full, clear, and exact description thereof, reference being had to the accompanying drawings, and to the figures of reference marked thereon, which form a part of this specification.

This invention relates to improvements in coaster-brakes for bicycles and motorcycles. The improvements constituting my invention are more especially adapted for use in connection with a coaster-brake device which is associated with the crank-shaft and crank-shaft hanger of a bicycle or the like, and the same are illustrated in the accompanying drawings in connection with such a crank-shaft and hanger. Some of the principal features of my invention may, however, be applied to coaster-brakes applied between a wheel-hub and the rotative driving member through which motion is given to the driven wheel of a cycle.

The invention consists in the matters hereinafter described and pointed out in the appended claims.

As shown in the accompanying drawings: Figure 1 is a view in side elevation of parts of the bicycle frame adjacent to the crank-shaft, together with the crank-arm, driving sprocket-wheel and associated parts. Fig. 2 is a view in horizontal section of the parts shown in Fig. 1, the crank-shaft and crank-arm being shown in elevation. Fig. 3 is a detail section on a larger scale showing exterior parts in section and the interior parts in elevation. Fig. 4 is a sectional view corresponding with Fig. 3, but showing all parts of the device excepting a portion of the crank-shaft in section. Fig. 5 is a cross section taken upon line 5—5 of Fig. 4. Fig. 6 is a cross-section taken upon line 6—6 of Fig. 4. Fig. 7 is a cross-section taken upon line 7—7 of Fig. 4. Fig. 8 is a cross-section take upon line 8—8 of Fig. 4. Fig. 9 is a perspective view of the endwise movable, non-rotative sleeve of the device. Fig. 10 is a perspective view of the expansible brake-ring. Fig. 11 is a perspective view of the brake-ring expanding wedge.

As shown in the drawings, 1 indicates the tubular crank hanger sleeve of the bicycle frame, which is rigidly secured to the upwardly and rearwardly extending frame-member thereof in the usual manner.

2 indicates the crank-shaft which is provided with crank-arms 3 and 4. The crank-shaft and crank-arms are made in one piece or integral with each other. The crank-shaft and its attached arms are adapted for insertion into the hanger-sleeve 1 by inserting one of the crank-arms endwise through the hanger-sleeve, while all of the annular parts of the device, interposed between the hanger-sleeve and the crank-shaft, are adapted to be assembled by slipping them over the crank-arm 4. Said crank-shaft 2 is provided, adjacent to the crank-arm 3, with an annular bearing-member or cone 5, which has the form of an annular enlargement of the crank-shaft and constitutes the inner member of an anti-friction ball bearing.

6 indicates the sprocket-wheel through which motion is transmitted to the rear wheel of the bicycle from the crank-shaft. Said sprocket wheel is located adjacent to the crank-arm 3 and is secured to an annular member or hub 7, which is adapted for rotative movement relatively to the crank-shaft and also relatively to the fixed hanger-sleeve 1.

At the end of the hanger-sleeve 1, adjacent to the sprocket-wheel and secured to said hanger-sleeve by screw-threaded connection, is a bearing-ring 8, between which and the hub ring 7 is an anti-friction ball bearing embracing balls or rollers 9, by which the said hub ring 7 is held in concentric relation to the said hanger-sleeve 1. Between said hub 7 and the cone 5 on the crank-shaft, are interposed bearing balls 10, forming an anti-friction bearing by which the shaft is supported and adapted to turn in said hub. At the opposite end of the crank-sleeve, or that adjacent to the crank-arm 4, is a bearing ring 11 which is inserted within said hanger-sleeve and secured thereto by screw-threaded connection. In its part within said bearing ring 11 the said crank-shaft is provided with screw-threads 12 to which is applied an annular bearing member or cone 13 which may be adjusted endwise on the shaft and which is secured or locked in its adjusted position. Between the cone 13 and the bearing ring 11 are interposed bearing balls 14, affording an anti-friction bearing between said parts. As shown, a lock-nut 15 is applied to the screw-threads 12 outside the cone 13, a non-rotative washer 16 being interposed between the lock-nut and the cone, as common in like devices.

Attached to the hub 7 is a cylindric friction-brake sleeve 20 which extends from said hub inwardly within the hanger-sleeve and terminates adjacent to the inner end of the fixed bearing sleeve 11. So far as the operation of the device is concerned, the sleeve 20 may be made in one piece or integral with the hub but it is preferably attached to said hub by a screw-joint in order that the parts of the device may be assembled and taken apart when the shaft and its arms are made integral with each other, as in the construction shown. Said hub is provided with an annular, inwardly projecting part 21 to which the sleeve 20 is attached and which constitutes a friction-clutch member. Said friction-clutch member 21 is provided with an inwardly facing conical or tapered bearing surface 22. The crank-shaft 2 is provided at its end adjacent to the sprocket-wheel with screw-threads 23 of large pitch, and surrounding the screw-threaded part of the shaft in engagement with said screw-threads 23, is a friction-clutch ring 24 provided with an exterior conical bearing surface adapted to fit within and engage the conical bearing surface 22 of the clutch member 21 on the hub. These parts are so arranged that by the turning of the crank-shaft in a forward or propelling direction, the friction-clutch ring 24 will be carried into frictional engagement with the friction-clutch member 21, thereby establishing frictional driving connection between the crank-shaft and the sprocket-wheel, which latter constitutes the driven member of the device.

25 indicates a non-rotative, endwise sliding sleeve which surrounds the crank-shaft within the cylindric friction-brake sleeve 20. Said brake-actuating sleeve 25 is held from turning by engagement of its left hand end with the non-rotative bearing ring 11. For this purpose said sleeve, as clearly seen in Fig. 9, is provided at its left hand end, which fits concentrically within said bearing ring 11, with a longitudinal slot or notch 32, which is engaged by an inwardly extending longitudinal lug 27 (Figs. 2 and 5) formed integrally upon and projecting inwardly from the inner surface of said bearing ring 11. The right hand end of the said sleeve 25 is provided with an outwardly extending annular flange which forms a shoulder on the said sleeve 25, facing toward the left, as shown. The friction-clutch ring 24 has at its left hand end a cylindric part of smaller diameter, which enters within, or is surrounded and embraced by, the right hand end of the sleeve 25. For convenience in assembling the parts when the crank-axle and its arms are made integral with each other, the said friction-clutch ring 24 is split longitudinally to form two parts or segments which may be separately applied to or placed around the screw-threaded part of the crank-shaft assembling the parts. These two parts or segments constituting the friction-clutch ring are held in proper position relatively to each other and in engagement with the screw-threads on the crank-shaft by the right hand end of the sleeve 25, which surrounds the cylindric left hand end of the same, as stated.

The right hand face or edge of the sleeve 25 is provided with a series of ratchet teeth or serrations, while the annular face or shoulder on the larger part of the friction-clutch ring, which faces toward the left, is provided with corresponding ratchet teeth or serrations adapted to engage those upon the said sleeve 25. The teeth or serrations on both the said parts have abrupt or holding faces so arranged that when the friction-clutch ring is pressed against the end of the sleeve it will be interlocked therewith in a manner to prevent backward turning of the said friction-clutch ring with the crank-shaft, while in the forward turning of the shaft, the friction-clutch ring will be shifted toward the right by the action of the screw-threads on the shaft and will thereby become disengaged from the said sleeve. The parts are so arranged, moreover, that in the backward turning of the crank-shaft the friction-clutch ring will first be carried against the end of the sleeve and locked to the same, and in the further backward turning of the shaft, the said ring will be moved endwise toward the left and thrust the said sleeve endwise with it in the same direction. In the intermediate or neutral position of the friction-clutch ring it will be free from contact with the friction-clutch member 21 and will exert no endwise pressure on the sleeve 25.

Surrounding the brake-actuating sleeve 25, between the same and the cylindric friction-brake member 20, is a cylindric split, expansible brake-ring 26 made of spring metal. Said brake-ring is normally contracted into contact with the sleeve 25 and is adapted when expanded for frictional engagement with the inner surface of said sleeve 20. The ends of said split brake-ring, indicated by 27 in Fig. 3, are oppositely inclined and between the same is inserted an endwise movable wedge 28, having the form of a curved plate, which is loosely held or confined between the sleeve 25 and cylinder 20 and bears at its larger end or base against the annular shoulder on the right hand end of said brake-actuating sleeve 25. Said brake-ring 26 is non-rotative, being held from rotation by engagement of a notch formed at its left hand end with two longitudinally extending holding lugs 29, 29 formed on the fixed bearing ring 11, as clearly seen in Figs. 3 and 4.

The operation of the device made as described is as follows: The parts being in the neutral position thereof or with the friction-clutch ring 24 out of contact with the friction-clutch member 21 and exerting no pressure on the sleeve 25, if the crank-shaft be turned forwardly the turning of the screw-threaded part of said shaft within the friction-clutch ring will shift or move the latter endwise toward the right so that it comes into frictional engagement with the clutch member 21, and driving connection will be established between the crank-shaft and the sprocket-wheel for driving the bicycle forward. When by the backward turning of said shaft, the friction-clutch ring is, by the action of said screw-threads, moved or shifted toward the left, it will first come into contact with the said sleeve 25 and then act to thrust said sleeve endwise toward the left, and the annular shoulder on said sleeve, pressing on the wedge 28, forces the latter between the separated ends of the brake-ring 26 and expands the same into frictional contact with the cylindric brake-member 20. A braking or frictional connection is thus established between a non-rotative part of the machine frame, to wit, the bearing ring 11, and said brake-member 20, which is attached to and turns with the sprocket-wheel. The inclination of the bearing or contact surfaces between the brake-ring 26 and the wedge 28 is such that when the endwise pressure on said wedge is relieved by the forward turning of the crank-shaft, the wedge will be shifted or forced toward the right by the pressure thereon of the ends of the brake-ring, due to the tendency of the same to contract, and the endwise movement so given to the wedge plate is transmitted to the endwise movable sleeve 25, which latter is thereby shifted endwise toward the right to its normal or neutral position. When no endwise pressure is exerted by the friction-clutch ring 24 against the sleeve 25, the brake-ring 26 will be contracted and free from contact with the sleeve 20. When the said friction-clutch ring is in contact with the friction-clutch member 21, a backward turning movement of the crank-shaft will shift said ring to the left and into contact with the end of the sleeve 25, when it will become interlocked with said sleeve and any backward turning of the same with the shaft will be prevented. Further backward turning movement of the crank-shaft will then drive the ring to the left and with it the sleeve 25, with the effect of pressing the wedge 28 endwise between the ends of the brake-ring, and establishing frictional engagement between said brake-ring and the sprocket-wheel, and as the said brake-ring is non-rotative, the rotation of the sprocket-wheel will be checked to a greater or less extent according to the degree of backward pressure exerted on the crank-arm. If the crank-shaft be turned either backwardly or forwardly from its driving or braking position to an intermediate or neutral position, the friction-clutch ring will be free from the friction-clutch member 21 and will exert no endwise pressure on the sleeve 25. In this neutral position of the parts, there will be no frictional engagement of the expansible brake-ring with the friction-brake member 20 nor between the friction-clutch ring and the friction-clutch member 21, so that the sprocket-wheel will be free to turn or revolve either backwardly or forwardly. The bicycle may then be rolled or moved either backward or forward, as its driving wheel will turn freely in both directions.

All of the parts of the devices described and illustrated are so made that they can be easily assembled or taken apart notwithstanding the fact that the hanger sleeve has the form of a continuous tube, and the crank-shaft and crank-arms are made in one piece. As hereinbefore described, the friction-clutch ring 24 is made in two parts or segments which may be separately applied to the screw-threaded portion of the crank-shaft, and which are held in engagement with the crank-shaft by the sleeve 25. The slot or opening extending inwardly from the left hand end of the said sleeve is made wider than the diameter of the crank-shaft and crank-arm, so that said sleeve may be readily removed past or over the bend connecting the left-hand crank-arm with the crank-shaft. The brake-ring 26, being provided with a relatively wide, wedge-shaped opening between its ends as shown, may, in a similar manner, be slipped over the bend joining the said left hand crank-arm with the crank-shaft. The sleeve 20, when unscrewed from the hub 7, may be removed in like manner over the left hand crank-arm, because of its large diameter relatively to its length.

While the several parts of the device are so made that they may be readily applied to crank-shafts having integral crank-arms, as described, yet the special features of construction by which the parts are adapted for use in connection with such a crank-shaft are not essential so far as the operation of a device embodying the main features of my invention is concerned. Some of the features of my invention may, however, be employed in connection with a coaster brake device applied between the wheel hub of a bicycle or the like and the rotative driving member through which rotative motion is transmitted to the same.

The form of coaster brake shown in the accompanying drawings as embodying one practical form of my invention may be variously modified in practice, and I do not therefore desire to be limited to the details of construction therein illustrated except so far as the same are claimed in the appended claims.

I claim as my invention:—

1. The combination with a crank-hanger sleeve and a crank-shaft mounted therein, of a sprocket-wheel provided with a hub which has bearing engagement with said hanger-sleeve and with said crank-shaft, means operated by the forward turning movement of the crank-shaft producing frictional driving connection between said crank-shaft and said sprocket-wheel hub, a brake-device affording frictional engagement between the hanger-sleeve and said sprocket-wheel hub, and means for actuating said brake-device operated by the backward turning of said crank-shaft.

2. The combination with a crank-hanger sleeve, of a sprocket-wheel having a hub which is supported by and has bearing engagement with one end of said hanger-sleeve, a crank-shaft one end of which is supported by and has bearing engagement with the hanger-sleeve and the other end of which is supported by and has bearing engagement with the sprocket-wheel hub, a friction-clutch device located within the hanger-sleeve and operated by the forward turning movement of the crank-shaft, for producing driving connection between the crank-shaft and the sprocket-wheel, and a friction-brake device located within the hanger-sleeve and operated by the backward turning movement of said crank-shaft for producing frictional engagement between the hanger-sleeve and the said sprocket-wheel.

3. The combination with a crank-hanger sleeve and a crank-shaft mounted therein, of a sprocket-wheel provided with a hub which has bearing engagement with said hanger-sleeve and with said crank-shaft, said hub being provided with an annular friction-clutch member and with an annular friction-brake member, a friction-clutch member having movement endwise of the crank-shaft and adapted to be brought into frictional contact with said friction-clutch member on the sprocket-wheel hub by the forward turning movement of the said crank-shaft, a non-rotative friction-brake member in the hanger-sleeve, adapted for engagement with said friction-brake member on the sprocket-wheel hub, and means for operating said non-rotative friction-brake member actuated by the movement of the said friction-clutch member endwise of the crank-shaft in the backward turning movement of said crank-shaft.

4. The combination with a crank-hanger sleeve and a crank-shaft mounted therein, of a sprocket-wheel provided with a hub which has bearing engagement with said hanger-sleeve and with said crank-shaft, said hub being provided with an annular friction-clutch member and with an annular friction-brake member, a friction-clutch ring surrounding said shaft and adapted for endwise movement thereon by the turning movement of said shaft, a friction-brake member located within the hanger-sleeve and adapted to co-act with the friction-brake member on the sprocket-wheel hub, and an endwise movable brake-actuating sleeve having non-rotative, endwise sliding connection with the hanger-sleeve and which is shifted endwise by said friction-clutch ring.

5. The combination with a crank-hanger sleeve, of a crank-shaft and crank-arm thereon made in one piece, said crank-shaft being provided with screw-threads, a sprocket-wheel hub provided with an annular friction-clutch member, a cylindric friction-brake member detachably secured to said sprocket-wheel hub, a friction-clutch ring surrounding said crank-shaft and engaging the screw-threads thereon, said friction-clutch ring consisting of a plurality of parts or segments, a non-rotative clutch-actuating sleeve, an annular fixed bearing member for the shaft, detachably secured to said hanger-sleeve, said clutch-actuating sleeve being adapted to slide endwise at one end in said bearing-ring and having a longitudinal slot, and said bearing-ring having an inwardly projecting lug engaging said slot, a split friction-brake sleeve surrounding said brake-actuating sleeve within the said cylindric friction-clutch member, and means for expanding said friction-brake ring, operated by the endwise movement of said brake-actuating sleeve.

In testimony, that I claim the foregoing as my invention I affix my signature in the presence of two witnesses, this 4th day of January A. D. 1909.

CHARLES A. BAYLOR.

Witnesses:
WILLIAM RICE SMITH,
DAVID H. McGILL.